(12) United States Patent
Niu et al.

(10) Patent No.: US 11,599,768 B2
(45) Date of Patent: Mar. 7, 2023

(54) COOPERATIVE NEURAL NETWORK FOR RECOMMENDING NEXT USER ACTION

(71) Applicant: INTERNATIONAL BUSINESS MACHINES CORPORATION, Armonk, NY (US)

(72) Inventors: Kai Niu, San Jose, CA (US); Jiali Huang, San Jose, CA (US); Christopher H. Doan, Austin, TX (US); Michael D. Elder, Durham, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 846 days.

(21) Appl. No.: 16/516,131

(22) Filed: Jul. 18, 2019

(65) Prior Publication Data
US 2021/0019592 A1 Jan. 21, 2021

(51) Int. Cl.
*G06N 3/04* (2006.01)
*G06F 17/16* (2006.01)
*H04L 67/10* (2022.01)

(52) U.S. Cl.
CPC .............. *G06N 3/04* (2013.01); *G06F 17/16* (2013.01); *H04L 67/10* (2013.01)

(58) Field of Classification Search
CPC .......... G06F 17/16; G06F 17/28; G06F 17/30; G06F 19/008; G06N 3/04; G06N 3/08; G06N 5/00; G06N 5/02; G06N 5/022; G06N 7/00; G06Q 30/06; G06Q 40/08; G10L 15/16; G10L 15/22

USPC ............ 704/232; 705/1, 10, 14.53, 26.7, 27; 706/16, 12, 14

See application file for complete search history.

(56) References Cited

U.S. PATENT DOCUMENTS

| | | | |
|---|---|---|---|
| 7,672,913 B2 | 3/2010 | Kaplan et al. | |
| 9,779,085 B2 | 10/2017 | Wick et al. | |
| 10,824,941 B2 * | 11/2020 | Volkovs | G06N 3/0454 |
| 2010/0049538 A1 | 2/2010 | Frazer et al. | |
| 2016/0071010 A1 | 3/2016 | Tian et al. | |
| 2017/0053646 A1 | 2/2017 | Watanabe et al. | |
| 2017/0185894 A1 | 6/2017 | Volkovs et al. | |
| 2017/0277658 A1 | 9/2017 | Pratas et al. | |

(Continued)

FOREIGN PATENT DOCUMENTS

CN 107103285 A 8/2017

OTHER PUBLICATIONS

Mikolov, et al., "Distributed Representations of Words and Phrases and their Compositionality," arXiv:1310.4546v1, [cs.CL], Oct. 16, 2013, 9 pages.

(Continued)

*Primary Examiner* — Shawkat M Ali
(74) *Attorney, Agent, or Firm* — Conley Rose, P.C.

(57) ABSTRACT

A method for recommending an action to a user of a user device includes receiving first user action data corresponding to a first user action and receiving second user action data corresponding to a second user action. The method also includes generating, based on the first user action data and the second user action data and using a feedforward artificial neural network, a recommendation for a next user action. The method also includes causing the recommendation for the next user action to be communicated to the user device.

20 Claims, 6 Drawing Sheets

(56) References Cited

U.S. PATENT DOCUMENTS

2018/0114116 A1  4/2018  Liang et al.

OTHER PUBLICATIONS

Mikolov, et al., "Efficient Estimation of Word Representations in Vector Space," arXiv:1301.3781v3, [cs.CL], Sep. 7, 2013, 12 pages.
"Machine Learning Algorithms for Smart Meter Diagnostics," IP.com No. IPCOM000242462D, Jul. 16, 2015, 53 pages.
"Artificial Neural Network," Wikipedia, May 15, 2019, 43 pages.
Bornstein, "Beyond Word Embeddings Part 2," Beyond Word Embeddings Part 2—Word Vectors & NLP Modeling from BoW to BERT, https://towardsdatascience.com/beyond-word-embeddings-part-2-word-vectors-nlp-modeling-from-bow-to-bert-4ebd4711d0ec, downloaded from the Internet May 30, 2019, 15 pages.
"Continuous Bag of Words (CBOW)," From Data to Decisions—Integrated Knowledge Solutions, https://iksinc.online/tag/continuous-bag-of-words-cbow/, downloaded from the Internet May 31, 2019, 7 pages.
Zhang, et al., "Deep Neural Networks with Multi-Branch Architectures Are Less Non-Convex," arXiv:1806.01845v2 [cs.LG], Jun. 21, 2018, 26 pages.
Schwab, "Embeddings: A Matrix of Meaning," Embeddings: A Matrix of Meaning—Petuum, Inc.—Medium, https://medium.com/@Petuum/embeddings-a-matrix-of-meaning-4de877c9aa27, downloaded from the Internet May 13, 2019, 10 pages.
"Feature (Machine Learning)," Wikipedia, downloaded from the Internet May 10, 2019, 3 pages.
"Feedforward Neural Network," Wikipedia, downloaded from the Internet May 10, 2019, 4 pages.
Pennington, et al., "GloVe: Global Vectors for Word Representation," Proceedings of the 2014 Conference on Empirical Methods in Natural Language Processing (EMNLP), pp. 1532-1543, Oct. 25-29, 2014, Doha, Qatar. c 2014 Association for Computational Linguistics, pp. 1532-1543.
Sarkar, "Implementing Deep Learning Methods and Feature Engineering for Text Data: The Continuous Bag of Words (CBOW)," https://www.kdnuggets.com/2018/04/implementing-deep-learning-methods-feature-engineering-text-data-cbow.html, downloaded from the Internet May 13, 2019, 11 pages.
"Introduction to TensorFlow," Introduction to TensorFlow—GeeksforGeeks, https://www.geeksforgeeks.org/introduction-to-tensorflow/, downloaded from the Internet May 14, 2019, 15 pages.
"Word Embeddings: From Count Vectors to Computer Vision Model in 10 minutes," Intuitive Understanding of Word Embeddings: Count Vectors to Word2Vec, https://www.analyticsvidhya.com/blog/2017/06/word-embeddings-count-word2veec/, downloaded from the Internet May 13, 2019, 37 pages.
"JavaScript Array slice() Method," https://www.w3schools.com/jsref/jsref_slice_array.asp, downloaded from the Internet May 13, 2019, 8 pages.
Wang, et al., "Learning Two-Branch Neural Networks for Image-Text Matching Tasks," arXiv:1704.03470v4, [cs.CV], May 1, 2018, 14 pages.
"Machine learning—Can someone explain to me the difference between a cost function and the gradient descent equation in logistic regression?", https://stackoverflow.com/questions/13623113/can-someone-explain-to-me-the-difference-between-a-cost-function-and-the-gradien, downloaded from the Internet May 13, 2019, 6 pages.
Miller, "Machine Learning week 1: Cost Function, Gradient Descent and Univariate Linear Regression," https://medium.com/@lachlanmiller_52885/machine-learning-week-1-cost-function-gradient-descent-and-univariate-linear-regression-8f5fe69815fd, downloaded from the Internet May 13, 2019, 13 pages.
"Neural Networks,"—Neural Networks—Architecture, https://cs.stanford.edu/people/eroberts/courses/soco/projects/neural-networks/Architecture/feedforward.html, downloaded from the Internet May 9, 2019, 3 pages.
"Neural Networks,"—Neural Networks—Neuron, https://cs.stanford.edu/people/eroberts/courses/soco/projects/neural-networks/Neuron/index.html, downloaded from the Internet May 9, 2019, 3 pages.
"CBOW v.s. skip-gram: why invert context and target words?," nlp—CBOW v.s. skip-gram: why invert context and target words?—Stack Overflow, https://stackoverflow.com/questions/38287772/cbow-v-s-skip-gram-why-invert-context-and-target-words, downloaded from the Internet May 13, 2019, 7 pages.
"Perceptron," Wikipedia, downloaded from the Internet May 10, 2019, 8 pages.
"Private Cloud Editable PPT," PrivateCloudEditablePPT—Google Search, downloaded from the Internet Jul. 12, 2019, 1 page.
"IBM Cloud Private Diagram Template," IBM Cloud Architecture Center, Nov. 7, 2018, 3 pages.
"What does tf.nn.embedding_lookup function do?," python—What does tf.nn.embedding_lookup function do?—Stack Overflow, https://stackoverflow.com/questions/34870614/what-does-tf-nn-embedding-lookup-function-do, downloaded from the Internet May 17, 2019, 10 pages.
"Python | Tensorlow nn.relu() and nn.leaky_relu()," Python | Tensorflow nn.relu() and nn.leaky_relu()—GeeksforGeeks, https://www.geeksforgeeks.org/python-tensorflow-nn-relu-and-nn-leaky_relu/; downloaded from the Internet May 14, 2019, 5 pages.
"Recommender System," Wikipedia, downloaded from the Internet May 15, 2019, 14 pages.
"The #1 Keystroke Logger Software," Spytech SpyAgent Keystroke Logger—Computer Monitoring Software for Parents and Employers, https://www.spytech-spyagent.com/keystroke-logger.html?gclid=EAIaIQobChMlzvrh7vP24glVm7fACh1ibArZEAAYAyAAEgltOPD_BwE, downloaded from the Internet Jun. 19, 2019, 16 pages.
"tf.slice," tf.slice | TensorFlow Core 1.13 | TensorFlow, https://www.tensorflow.org/api_docs/python/tf/slice, downloaded from the Internet May 19, 2019, 2 pages.
Adomavicius, et al., "Toward the Next Generation of Recommender Systems: A Survey of the State-of-the-Art and Possible Extensions," IEEE Transactions on Knowledge and Data Engineering, vol. 17, No. 6, Jun. 2005, pp. 734-749.
"Unsupervised Learning," Wikipedia, downloaded from the Internet May 10, 2019, 4 pages.
Brogan, "What are the continuous bag of words and skip-gram architectures?," What are the continuous bag of words and skip-gram architectures?—Quora, https://www.quora.com/What-are-the-continuous-bag-of-words-and-skip-gram-architectures, downloaded from the Internet May 13, 2019, 4 pages.

* cited by examiner

COOPERATIVE NEURAL NETWORK FOR RECOMMENDING NEXT USER ACTION

BACKGROUND

The present disclosure relates to cognitive computing and, more particularly, to recommending a next action for a user of an application or device.

Modern enterprise middleware dashboards organize complex systems of information. Training and learning curves required for individual users to become effective with such tools can be costly and time consuming. While some users may readily master the setups and other operations of complex applications, at one time or another even a rocket scientist might benefit from a recommendation of what to do next.

SUMMARY

A method for recommending an action to a user of a user device is disclosed. The method includes receiving first user action data corresponding to a first user action and receiving second user action data corresponding to a second user action. The method also includes generating, based on the first user action data and the second user action data and using a feedforward artificial neural network, a recommendation for a next user action. The method also includes causing the recommendation for the next user action to be communicated to the user device.

A system for recommending an action to a user of a user device is disclosed. The system includes a memory having instructions therein and at least one processor in communication with the memory. The at least one processor is configured to execute the instructions to receive first user action data corresponding to a first user action and receive second user action data corresponding to a second user action. The at least one processor is also configured to execute the instructions to generate, based on the first user action data and the second user action data and using a feedforward artificial neural network, a recommendation for a next user action. The at least one processor is also configured to execute the instructions to cause the recommendation for the next user action to be communicated to the user device.

A computer program product for recommending an action to a user of a user device is also disclosed. The computer program product includes a computer readable storage medium having program instructions embodied therewith. The program instructions are executable by at least one processor to cause the at least one processor to receive first user action data corresponding to a first user action and receive second user action data corresponding to a second user action. The program instructions are also executable by the at the least one processor to cause the at least one processor to generate, based on the first user action data and the second user action data and using a feedforward artificial neural network, a recommendation for a next user action. The program instructions are also executable by the at least one processor to cause the at least one processor to cause the recommendation for the next user action to be communicated to the user device.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

Figure 1:
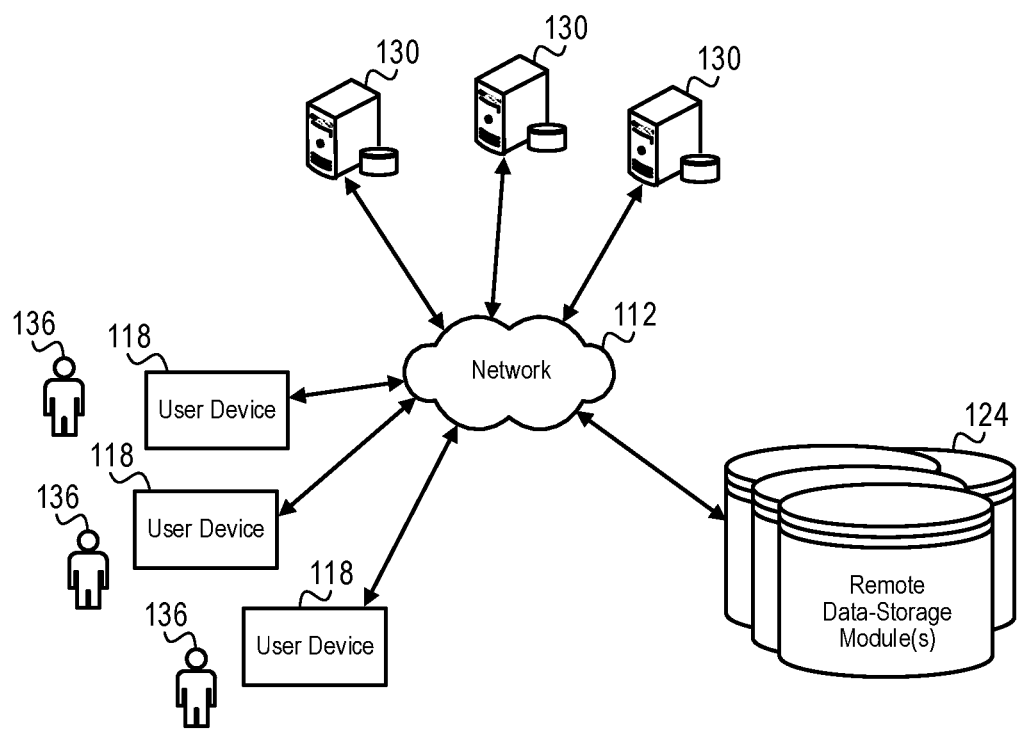
FIG. 1 is a block diagram illustrating a network environment in accordance with aspects of the present disclosure.

The illustrated figures are only exemplary and are not intended to assert or imply any limitation with regard to the environment, architecture, design, or process in which different embodiments may be implemented.

DETAILED DESCRIPTION

It should be understood at the outset that, although an illustrative implementation of one or more embodiments are provided below, the disclosed systems, computer program product, and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

As used within the written disclosure and in the claims, the terms "including" and "comprising" are used in an open-ended fashion, and thus should be interpreted to mean "including, but not limited to." Unless otherwise indicated, as used throughout this document, "or" does not require mutual exclusivity, and the singular forms "a," "an," and "the" are intended to include the plural forms as well, unless the context clearly indicates otherwise.

A "module" or "unit" as referenced herein comprises one or more hardware or electrical components such as electrical circuitry, processors, and memory that may be specially configured to perform a particular function. The memory may comprise volatile memory or non-volatile memory that stores data such as, but not limited to, computer executable instructions, machine code, and other various forms of data. The module or unit may be configured to use the data to execute one or more instructions to perform one or more tasks. In certain instances, a module or unit may also refer to a particular set of functions, software instructions, or circuitry that is configured to perform a specific task. For example, a module or unit may comprise software components such as, but not limited to, data access objects, service components, user interface components, application programming interface ("API") components; hardware components such as electrical circuitry, processors, and memory; and/or a combination thereof. As referenced herein, computer executable instructions may be in any form including, but not limited to, machine code, assembly code, and high-level programming code written in any programming language.

Also, as used herein, the term "communicate" and inflections thereof mean to receive and/or transmit data or information over a communication link. The communication link may include both wired and wireless links, and may comprise a direct link or may comprise multiple links passing through one or more communication networks or network devices such as, but not limited to, routers, firewalls, servers, and switches. The communication networks may comprise any type of wired or wireless network. The networks may include private networks and/or public networks such as the Internet. Additionally, in some embodiments, the term communicate may also encompass internal communication between various components of a system and/or with an external input/output device such as a keyboard or display device.

FIG. 1 is a block diagram illustrating a network environment 100 in accordance with aspects of the present disclosure. The network environment 100 includes a network 112, one or more user devices 118, one or more remote data-storage modules 124, one or more server devices 130, and one or more users 136. As used herein, the term "user action" and inflections thereof mean a set of one or more past, present, or potential inputs to the one or more user devices 118 from the one or more users 136 during setup or other operations of one or more applications on the one or more user devices 118, and "user action data" and inflections thereof mean data identifying or describing one or more user actions.

The network 112 comprises any type of network that enables the one or more server devices 130 to communicate with each other and with the one or more user devices 118 as well as with the one or more remote data-storage modules 124. For example, the network 112 may comprise one or more wired and/or wireless networks such as, but not limited to, one or more radio networks (e.g., cellular network or mobile network), one or more local area networks ("LANs"), one or more wide area networks ("WANs"), one or more metropolitan area networks ("MANs"), etc. The network 112 may also comprise one or more private networks and/or one or more public networks (such as, but not limited to, the Internet).

Each of the one or more user devices 118 is communicatively coupled to the network 112 and (through the network 112) to the one or more server devices 130 and the one or more remote data-storage modules 124. Each of the one or more user devices 118 comprises any type of device that allows the one or more users 136 to audibly, textually, or otherwise suitably interact with the one or more server devices 130 through the network 112. Each of the one or more user devices 118 is also configured to suitably generate, log or otherwise store, and communicate user action data in accordance with aspects of the present disclosure. Accordingly, some embodiments of the one or more user devices 118 may include a suitably modified version of the SpyAgent keylogger and computer monitoring software, which has been marketed by Spytech Software and Design, Inc., at https://www.spytech-spyagent.com/. It should be appreciated, however, that other embodiments may be configured to generate, log or otherwise store, and communicate user action data in any other suitable manner. Non-limiting examples of one of the one or more user devices 118 include a personal computer (desktop or laptop), a mobile device (e.g., personal digital assistant ("PDA"), smart phone, tablet, etc.), and a cognitive voice assistant device (e.g., Amazon's Alexa®, a Google Home® device, etc.). In some embodiments, the one or more user devices 118 may comprise a corresponding one or more of a data processing system 600 (the data processing system 600 is not shown in FIG. 1, but see FIG. 6).

Each of the one or more remote data-storage modules 124 is communicatively coupled to the network 112 and (through the network 112) to each other and to the one or more server devices 130 and the one or more user devices 118. The one or more remote data-storage modules 124 are configured to (alone or in combination) store and provide access to various data that may be generated, modified, and/or used in accordance with aspects of the present disclosure. In some embodiments, the one or more remote data-storage modules 124 may comprise a corresponding one or more of a data processing system 600 (the data processing system 600 is not shown in FIG. 1, but see FIG. 6).

Each of the one or more server devices 130 is communicatively coupled to the network 112 and (through the network 112) to each other and to the one or more remote data-storage modules 124 and the one or more user devices 118. Each of the one or more server devices 130 comprises any type of device that can (alone or in combination with one or more other components of the network environment 100) suitably implement a next user action recommendation module 200 in accordance with aspects of the present disclosure (the next user action recommendation module 200 is not shown in FIG. 1, but see FIG. 2). In some embodiments, the one or more server devices 130 may comprise a corresponding one or more of the data processing system 600 (the data processing system 600 is not shown in FIG. 1, but see FIG. 6). In some embodiments, the one or more server devices 130 may comprise one or more suitable computers, machines, modules, and/or devices provided by an Internet service provider.

Figure 2:
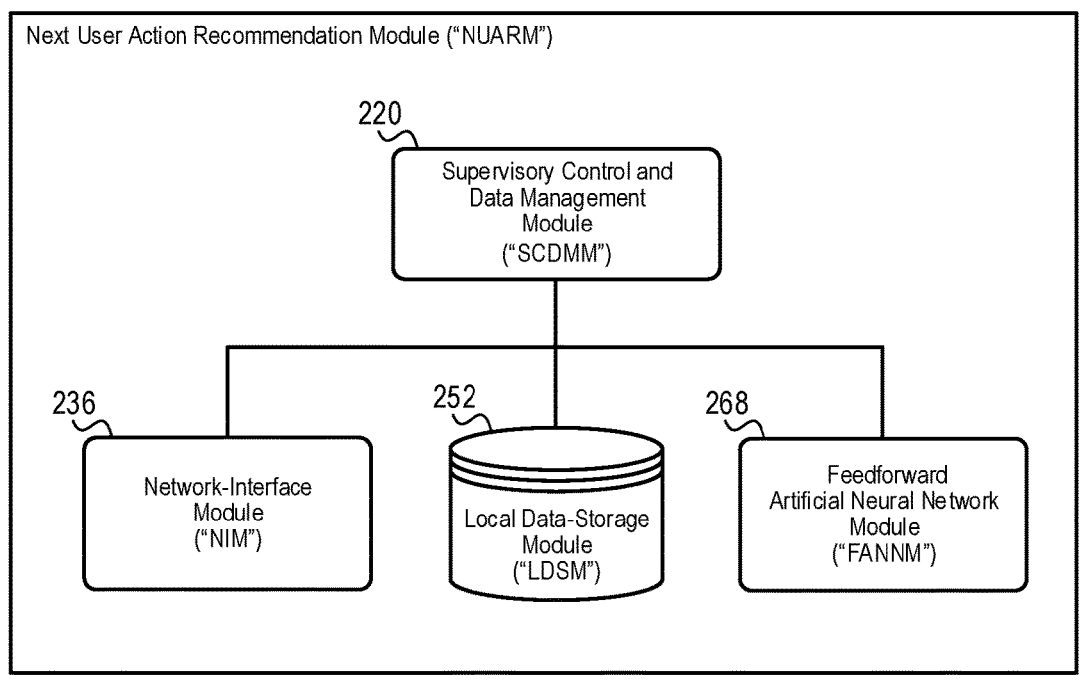
FIG. 2 is a block diagram illustrating a next user action recommendation module in accordance with aspects of the present disclosure.

FIG. 2 is a block diagram illustrating the next user action recommendation module ("NUARM") 200 in accordance with aspects of the present disclosure. As described further below, the NUARM 200 is configured to recommend a next user action for one of the users 136 during setup or other operations of one or more applications on one of the user devices 118 (the users 136 and the user devices 118 are not shown in FIG. 2, but see FIG. 1) in accordance with aspects of the present disclosure.

The NUARM 200 includes a supervisory control and data management module ("SCDMM") 220. The SCDMM 220 is configured to coordinate operations of other components of the NUARM 200 and to acquire, process, and move data in support of such operations in accordance with aspects of the present disclosure. In some embodiments, the SCDMM 220 may comprise one or more of the data processing system 600 (the data processing system 600 is not shown in FIG. 2, but see FIG. 6).

The NUARM 200 also includes a network interface module ("NIM") 236. The NIM 236 is communicatively coupled to, among other things, the SCDMM 220 and the network 112 (the network 112 is not shown in FIG. 2, but see FIG. 1). It should be appreciated that the NIM 236 is also communicatively coupled (through the network 112) to the one or more user devices 118, the one or more remote data-storage modules 124, and the one or more server devices 130 (the user devices 118, the remote data-storage modules 124, and the server devices 130 are not shown in FIG. 2, but see FIG. 1). The NIM 236 is configured to communicatively couple and act as an interface between the SCDMM 220, various other components of the NUARM 200, the network 112, and (through the network 112) various other components of the network environment 100 in accordance with aspects of the present disclosure. In some embodiments, the NIM 236 may comprise one or more of the data processing system 600 (the data processing system 600 is not shown in FIG. 2, but see FIG. 6). In some embodiments, the NIM 236 may be a component of one of the server devices 130 (the server devices 130 are not shown in FIG. 2, but see FIG. 1).

The NUARM 200 also includes a local data-storage module ("LDSM") 252. The LDSM 252 is communicatively coupled to, among other things, the SCDMM 220 and the NIM 236. It should be appreciated that the LDSM 252 is also communicatively coupled (through the NIM 236 and the network 112) to the one or more user devices 118, the one or more remote data-storage modules 124, and the one or more server devices 130 (the user devices 118, the remote data-storage modules 124, and the server devices 130 are not shown in FIG. 2, but see FIG. 1). The LDSM 252 is configured to store and provide access to various data that may be generated, modified, and/or used in accordance with aspects of the present disclosure. In some embodiments, the LDSM 252 may comprise one or more of the data processing system 600 (the data processing system 600 is not shown in FIG. 2, but see FIG. 6).

The NUARM 200 also includes a feedforward artificial neural network module ("FANNM") 268. The FANNM 268 is communicatively coupled to, among other things, the SCDMM 220, the NIM 236, and the LDSM 252. It should be appreciated that the FANNM 268 is also communicatively coupled (through the NIM 236 and the network 112) to the one or more user devices 118, the one or more remote data-storage modules 124, and the one or more server devices 130 (the user devices 118, the remote data-storage modules 124, and the server devices 130 are not shown in FIG. 2, but see FIG. 1). The FANNM 268 comprises a feedforward artificial neural network architecture 300 (the feedforward artificial neural network architecture 300 is not shown in FIG. 2, but see FIG. 3).

Figure 3:
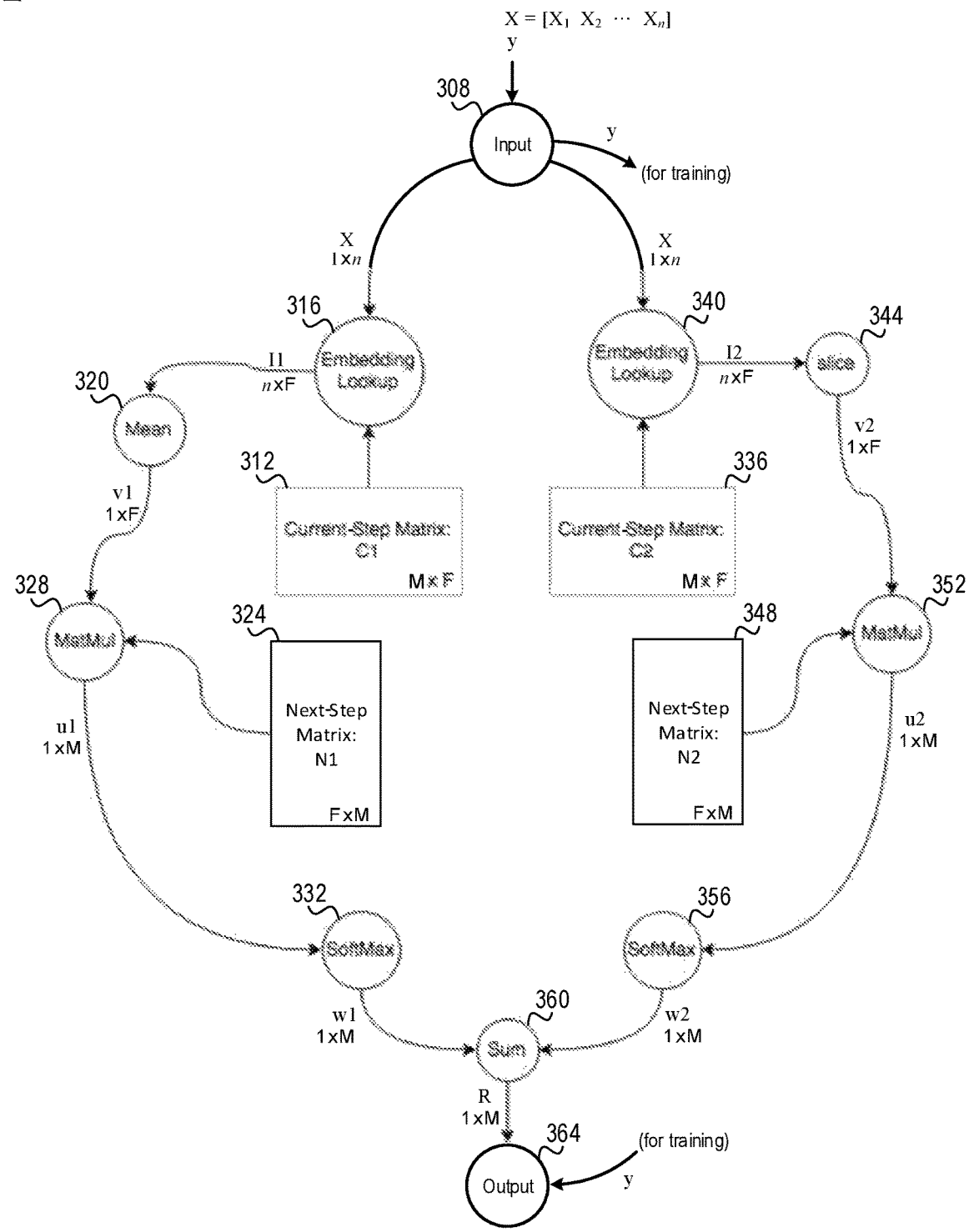
FIG. 3 is a block diagram illustrating a feedforward artificial neural network architecture in accordance with aspects of the present disclosure.

FIG. 3 is a block diagram illustrating the feedforward artificial neural network architecture ("FANNA") 300 in accordance with aspects of the present disclosure. As described further below, the FANNA 300 is configured to generate a row matrix, R, which may be used to recommend a next user action in accordance with aspects of the present disclosure. In some embodiments, the FANNA 300 may comprise one or more of the data processing system 600 (the data processing system 600 is not shown in FIG. 3, but see FIG. 6).

The FANNA 300 includes an input module 308. The input module 308 is configured to receive and communicate user action data corresponding to user actions within a model space of a number, M, of modeled user actions, such that a number, n, of sequential user actions may be expressed as a row matrix, X, having dimensions 1×n (i.e., such that X has n elements), where n is a predetermined (e.g., by a system developer) integer constant such that M≥(n+1)≥3, where each element of the row matrix, X, holds a value corresponding to a user action, and such that the next true user action after the number, n, of user actions (i.e., the next true user action after the user action corresponding the value of $X_n$) may be expressed as a quantity, y, where the value of y corresponds to that next true user action. For example, in some embodiments, within a space of one hundred modeled user actions (such that M=100), each user action may correspond to an identifying integer within the interval [1, 100], such that when the input module 308 receives [8 93 23] as user action data, X=[8 93] and y=23. As another example, in some similar embodiments, when the input module 308 receives [8 93 23 75], X=[8 93 23] and y=75, and, as another example, when the input module 308 receives [1 1 23 12 100], X=[1 1 23 12] and y=100.

The FANNA 300 also includes a current-step matrix module 312. The current-step matrix module 312 is configured to provide a current-step matrix, C1, having dimensions M×F (i.e., such that C1 has M rows and F columns), where F is a predetermined (e.g., by a system developer) integer constant greater than zero. The current-step matrix module 312 is also configured to index or otherwise map each consecutive row of the current-step matrix, C1, to one of the modeled user actions such that no two of the rows of the current-step matrix, C1, are mapped two the same one of the modeled user actions.

The FANNA 300 also includes an embedding lookup module 316. The embedding lookup module 316 is communicatively coupled to, among other things, the input module 308 and the current-step matrix module 312. The embedding lookup module 316 is configured to generate and communicate an input embedding matrix, I1, having dimensions n×F (i.e., such that I1 has n rows and F columns), such that each row, $I1_{i,*}$, of the input embedding matrix, I1, is a duplicate of whatever row of the current-step matrix, C1, has been indexed or otherwise mapped (by the current-step matrix module 312, described above) to the action identified by the value of $X_i$, (for i=1 to n). In other words, the embedding lookup module 316 looks up or fetches the rows of the current-step matrix, C1, that correspond to the values of the n elements of the row matrix, X, and outputs them as the input embedding matrix, I1. Accordingly, some embodiments of the embedding lookup module 316 may use a Tensorfow tf.nn.embedding_lookup function to generate the input embedding matrix, I1. "Tensorfow is an open-source machine learning library . . . . One of its applications is to developed deep neural networks." https://www.geeksforgeeks.org/python-tensorflow-nn-softplus/. "The module tensorflow.nn provides support for many basic neural network operations." Id. See also, https://www.tensorflow.org/ ("The core open source library to help you develop and train ML models. Get started quickly by running Colab notebooks directly in your browser."). It should be appreciated, however, that other embodiments may be configured to generate the input embedding matrix, I1, in any other suitable manner.

The FANNA 300 also includes a mean module 320. The mean module 320 is communicatively coupled to, among other things, the embedding lookup module 316. The mean module 320 is configured to generate and communicate a row matrix, v1, having dimensions 1×F (i.e., having F elements), such that the row matrix, v1, is a result of a row-wise matrix mean of the input embedding matrix, I1.

The FANNA 300 also includes a next-step matrix module 324. The next-step matrix module 324 is configured to provide a next-step matrix, N1, having dimensions F×M. The next-step matrix module 324 is also configured to index or otherwise map each consecutive column of the next-step matrix, N1, to each respective consecutive row of the current-step matrix, C1 (e.g., such that the first column of the next-step matrix, N1, is indexed or mapped to the first row of the current-step matrix, C1, while the second column of the next-step matrix, N1, is indexed or mapped to the second row of the current-step matrix, C1, and so on).

The FANNA 300 also includes a matmul module 328. The matmul module 328 is communicatively coupled to, among other things, the mean module 320 and the next-step matrix module 324. The matmul module 328 is configured to generate and communicate a row matrix, u1, having dimensions 1×M (i.e., having M elements), such that the row matrix, u1, is a result of a matrix multiplication of the row matrix, v1, by the next-step matrix, N1 (i.e., such that u1=v1×N1).

The FANNA 300 also includes a softmax module 332. The softmax module 332 is communicatively coupled to, among other things, the matmul module 328. The softmax module 332 is configured to generate and communicate a row matrix, w1, having dimensions 1×M (i.e., having M elements), such that the row matrix, w1, is a result of a softmax (i.e., transformation by application of a softmax or softargmax function) of the row matrix, u1 (i.e., such that w1=Softmax (u1), or w1=Softargmax (u1)).

The FANNA 300 also includes a current-step matrix module 336. The current-step matrix module 336 is configured to provide a current-step matrix, C2, having dimensions M×F. The current-step matrix module 336 is also configured to index or otherwise map each consecutive row of the current-step matrix, C2, to each respective consecutive row of the current-step matrix, C1 (e.g., such that the first row of the current-step matrix, C2, is indexed or mapped to the first row of the current-step matrix, C1, while the second row of the current-step matrix, C2, is indexed or mapped to the second row of the current-step matrix, C1, and so on).

The FANNA 300 also includes an embedding lookup module 340. The embedding lookup module 340 is communicatively coupled to, among other things, the input module 308 and the current-step matrix module 336. The embedding lookup module 340 is configured to generate and communicate an input embedding matrix, I2, having dimensions n×F, such that each row, of the input embedding matrix, I2, is a duplicate of whatever row of the current-step matrix, C2, has been indexed or otherwise mapped (by the current-step matrix module 336, described above) to the action identified by the value of $X_i$, (for i=1 to n). Thus, the embedding lookup module 336 may, in a way, be thought of as being configured to "look up" or "fetch" the rows of the current-step matrix, C2, which correspond to the values of the n elements of the row matrix, X, and output them as the input embedding matrix, I2. Accordingly, some embodiments of the embedding lookup module 336 may use a Tensorfow tf.nn.embedding_lookup function to generate the input embedding matrix, I2. It should be appreciated, however, that other embodiments may be configured to generate the input embedding matrix, I2, in any other suitable manner.

The FANNA 300 also includes a slice module 344. The slice module 344 is communicatively coupled to, among other things, the embedding lookup module 340. The slice module 344 is configured to generate and communicate a row matrix, v2, having dimensions 1×F, such that the row matrix, v2, is a duplicate of the nth row of the input embedding matrix, I2. Thus, the slice module 344 may, in a way, be thought of as being configured to "slice" a copy of the nth row from the input embedding matrix, I2, and output that row as the row matrix, v2. Further, it should be appreciated that the nth row of the input embedding matrix, I2, corresponds to whatever row of the current-step matrix, C2, has been indexed or otherwise mapped (by the current-step matrix module 336, described above) to the action identified by the value of X.

The FANNA 300 also includes a next-step matrix module 348. The next-step matrix module 348 is configured to provide a next-step matrix, N2, having dimensions F×M. The next-step matrix module 348 is also configured to index or otherwise map each consecutive column of the next-step matrix, N2, to each respective consecutive row of the current-step matrix, C2 (e.g., such that the first column of the next-step matrix, N2, is indexed or mapped to the first row of the current-step matrix, C2, while the second column of the next-step matrix, N2, is indexed or mapped to the second row of the current-step matrix, C2, and so on).

The FANNA 300 also includes a matmul module 352. The matmul module 352 is communicatively coupled to, among other things, the slice module 344 and the next-step matrix module 348. The matmul module 352 is configured to generate and communicate a row matrix, u2, having dimensions 1×M, such that the row matrix, u2, is a result of a matrix multiplication of the row matrix, v2, by the next-step matrix, N2 (i.e., such that u2=v2×N2).

The FANNA 300 also includes a softmax module 356. The softmax module 356 is communicatively coupled to, among other things, the matmul module 352. The softmax module 356 is configured to generate and communicate a row matrix, w2, having dimensions 1×M, such that the row matrix, w2, is a result of a softmax (i.e., transformation by application of a softmax or softargmax function) of the row matrix, u2 (i.e., such that w2=Softmax (u2), or w2=Softargmax (u2)).

The FANNA 300 also includes a sum module 360. The sum module 360 is communicatively coupled to, among other things, the softmax module 332 and the softmax module 356. The sum module 360 is configured to generate and communicate the row matrix, R, such that the row matrix, R, is a result of a matrix summation of the row matrix, w1, with the row matrix, w2, and, accordingly, such that the row matrix, R, has dimensions 1×M (i.e., such that R=w1+w2).

The FANNA 300 also includes an output module 364. The output module 364 is communicatively coupled to the sum module 360. During training operations, the output module 364 is also communicatively coupled to the input module 308. The output module 364 is configured to receive and communicate the row matrix, R, during operations of the FANNA 300 to generate a recommended next user action in accordance with aspects of the present disclosure. The output module is also configured to receive the row matrix, R, and the quantity, y, during training operations of the FANNA 300 in accordance with aspects of the present disclosure, and to generate cross-entropy losses (between the row matrix, R, and corresponding one-hot representations of the quantity, y) or other suitable cost function results during such training operations.

Figure 4:
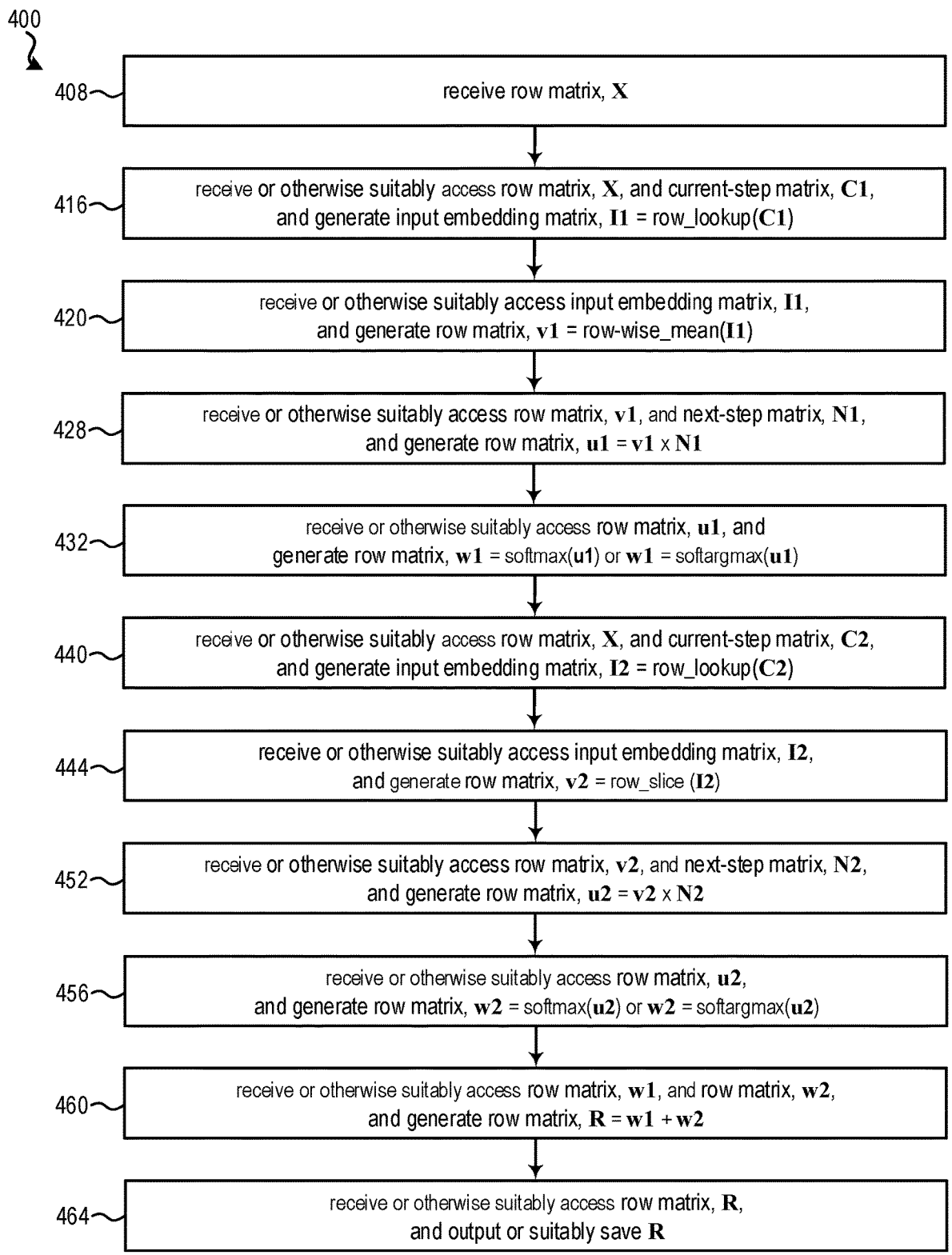
FIG. 4 is a flowchart illustrating forward-propagation operations of a feedforward artificial neural network architecture in accordance with aspects of the present disclosure.

FIG. 4 is a flowchart illustrating forward-propagation operations 400 of the FANNA 300 in accordance with aspects of the present disclosure. At step 408, the input module 308 receives the row matrix, X. It should be appreciated that the input module 308 may cause the row matrix, X, to be saved into the LDSM 252 or any other suitable memory.

At step 416, the embedding lookup module 316 receives (from the input module 308 and the current-step matrix module 312, respectively) or otherwise suitably accesses (e.g., in the LDSM 252 or other suitable memory) the row matrix, X, and the current-step matrix, C1. Further, the embedding lookup module 316 operates according to its above-described configuration to generate the input embedding matrix, I1. It should be appreciated that the embedding lookup module 316 may cause the input embedding matrix, I1, to be saved into the LDSM 252 or any other suitable memory.

At step 420, the mean module 320 receives (from the embedding lookup module 316) or otherwise suitably accesses (e.g., in the LDSM 252 or other suitable memory) the input embedding matrix, I1. Further, the mean module 320 operates according to its above-described configuration to generate the row matrix, v1. It should be appreciated that the mean module 320 may cause the row matrix, v1, to be saved into the LDSM 252 or any other suitable memory.

At step 428, the matmul module 328 receives (from the mean module 320 and the next-step matrix module 324, respectively) or otherwise suitably accesses (e.g., in the LDSM 252 or other suitable memory) the row matrix, v1, and the next-step matrix, N1. Further, the matmul module 328 operates according to its above-described configuration to generate the row matrix, u1. It should be appreciated that the matmul module 328 may cause the row matrix, u1, to be saved into the LDSM 252 or any other suitable memory.

At step 432, the softmax module 332 receives (from the matmul module 328) or otherwise suitably accesses (e.g., in the LDSM 252 or other suitable memory) the row matrix, u1. Further, the softmax module 332 operates according to its above-described configuration to generate the row matrix, w1. It should be appreciated that the softmax module 332 may cause the row matrix, w1, to be saved into the LDSM 252 or any other suitable memory.

At step 440, the embedding lookup module 340 receives (from the input module 308 and the current-step matrix module 336, respectively) or otherwise suitably accesses (e.g., in the LDSM 252 or other suitable memory) the row matrix, X, and the current-step matrix, C2. Further, the embedding lookup module 340 operates according to its above-described configuration to generate the input embedding matrix, I2. It should be appreciated that the embedding lookup module 340 may cause the input embedding matrix, I2, to be saved into the LDSM 252 or any other suitable memory.

At step 444, the slice module 344 receives (from the embedding lookup module 340) or otherwise suitably accesses (e.g., in the LDSM 252 or other suitable memory) the input embedding matrix, I2. Further, the slice module 344 operates according to its above-described configuration to generate the row matrix, v2. It should be appreciated that the slice module 344 may cause the row matrix, v2, to be saved into the LDSM 252 or any other suitable memory.

At step 452, the matmul module 352 receives (from the slice module 344 and the next-step matrix module 348, respectively) or otherwise suitably accesses (e.g., in the LDSM 252 or other suitable memory) the row matrix, v2, and the next-step matrix, N2. Further, the matmul module 352 operates according to its above-described configuration to generate the row matrix, u2. It should be appreciated that the matmul module 352 may cause the row matrix, u2, to be saved into the LDSM 252 or any other suitable memory.

At step 456, the softmax module 356 receives (from the matmul module 352) or otherwise suitably accesses (e.g., in the LDSM 252 or other suitable memory) the row matrix, u2. Further, the softmax module 356 operates according to its above-described configuration to generate the row matrix, w2. It should be appreciated that the softmax module 356 may cause the row matrix, w2, to be saved into the LDSM 252 or any other suitable memory.

At step 460, the sum module 360 receives (from the softmax module 332 and the softmax module 356, respectively) or otherwise suitably accesses (e.g., in the LDSM 252 or other suitable memory) the row matrix, w1, and the row matrix, w2. Further, the sum module 360 operates according to its above-described configuration to generate the row matrix, R. It should be appreciated that the sum module 360 may cause the row matrix, R, to be saved into the LDSM 252 or any other suitable memory.

At step 464, the output module 364 receives (from the sum module 360) or otherwise suitably accesses (e.g., in the LDSM 252 or other suitable memory) the row matrix, R. It should be appreciated that (to any extent that the row matrix, R, has not already been saved into the LDSM 252 or any other suitable memory) the output module 364 may cause the row matrix, R, to be saved into the LDSM 252 or any other suitable memory.

Figure 5:
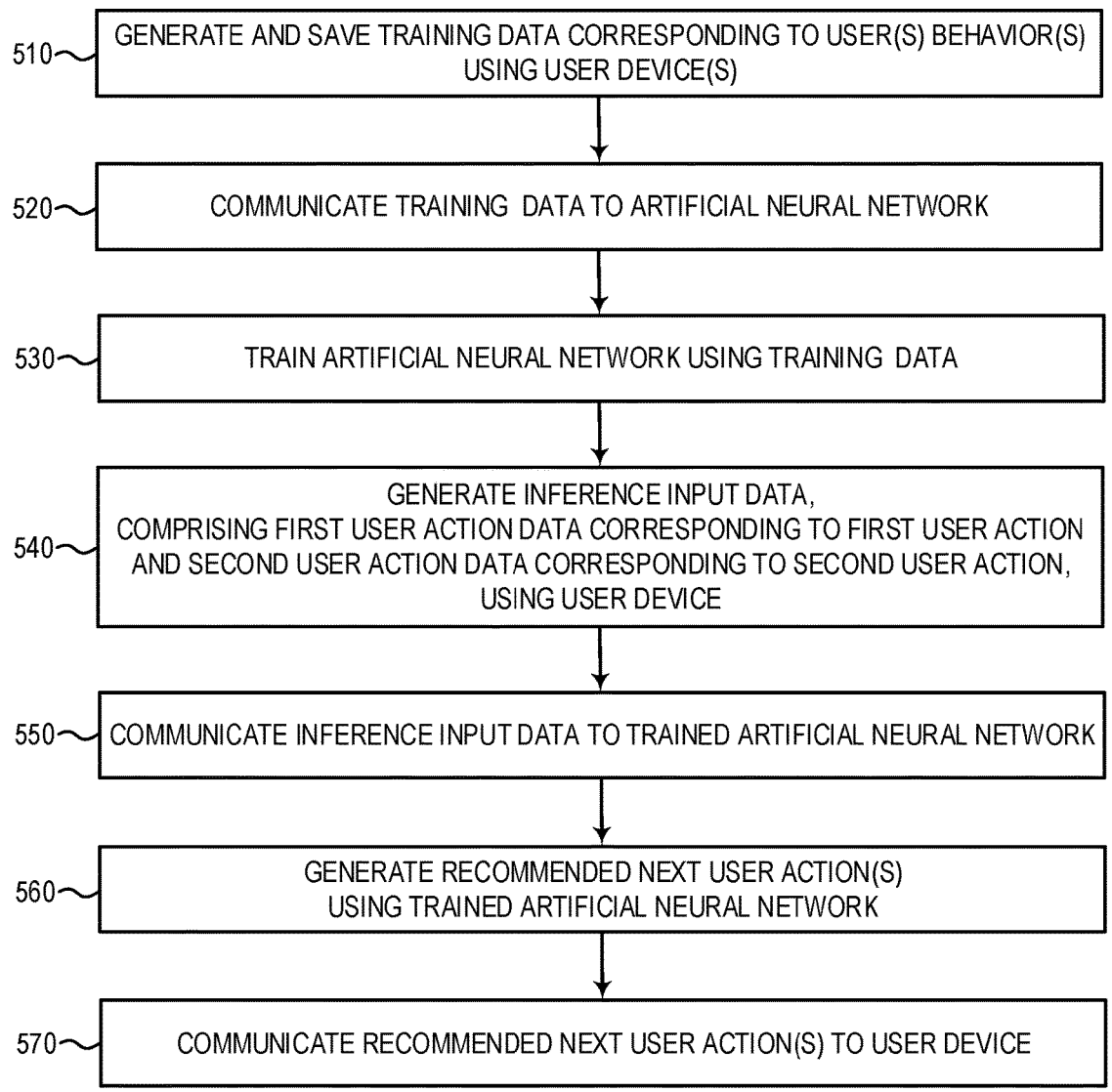
FIG. 5 is a flowchart illustrating a method for recommending a next user action in accordance with aspects of the present disclosure.

FIG. 5 is a flowchart illustrating a method 500 for recommending a next user action in accordance with aspects of the present disclosure. In some instances, one or more steps of the method 500 may be performed by one or more of the systems and/or components described herein. For clarity of exposition, the following description may refer to one or more of such systems and/or components. Nevertheless, it should be appreciated that the method 500 and/or any one or more of its particular steps may be performed by any suitable system(s) and/or component(s).

At step 510, the method 500 generates and saves training data corresponding to user(s) behavior(s) using user device(s). For example, when using the network environment 100, the one or more user devices 118 monitor or observe and log keystrokes, command line inputs, voice commands, and/or other user actions made by a corresponding one or more of the users 136 during setup or other operations of one or more applications on the one or more user devices 118. Further, the one or more user devices 118 generate corresponding training data records, where each training data record comprises its own corresponding row matrix, X, and its own corresponding quantity, y, such that each training data record expresses a sequence of user actions and the next true user action after that sequence of user actions. Also, the one or more user devices 118 save such training data into a suitable onboard memory and/or cause the training data to be saved into the one or more remote data-storage modules 124. It should be appreciated that, in a sense, the method 500 thus collects "wisdom of the crowd"—like user action data that may be used to train a model (and then make a recommendation) based on historical user actions.

At step 520, the method 500 communicates the training data (generated at step 510) to an artificial neural network. For example, when using the network environment 100, the SCDMM 220 causes the FANNM 268 (and more particularly, the input module 308) to receive (through the network 112 and the NIM 236) the training data records from one of the user devices 118 and/or from one or more of the remote data-storage modules 124.

At step 530, the method 500 trains the artificial neural network using the training data. For example, when using the network environment 100, the SCDMM 220 causes the FANNM 268 to initialize the elements of the current-step matrix, C1, and the elements of the current-step matrix, C2, from a uniform distribution over the range [−1, 1], and to initialize the elements of the next-step matrix, N1, and the elements of the next-step matrix, N2, from a unit normal distribution with a standard deviation of 0.1. The SCDMM 220 then causes the FANNM 268 to iteratively update the current-step matrix, C1, the current-step matrix, C2, the next-step matrix, N1, and the next-step matrix, N2 (through successive back-propagations, applying cross-entropy losses between results for the row matrix, R, and one-hot representations of training data expressing corresponding values of the quantity, y) until the cross-entropy loss or another suitable cost falls below a predetermined (e.g., by a system developer) level.

At step 540, the method 500 uses a user device to generate inference input data, comprising first user action data corresponding to first user action and second user action data corresponding to second user action. For example, when using the network environment 100, one of the user devices 118 monitors or observes and logs keystrokes, command line inputs, voice commands, and/or other user actions made by one of the users 136 during setup or other operations of one or more applications on that one of the user devices 118. Further, that one of the user devices 118 generates corresponding inference input data records, where each inference input data record comprises its own corresponding row matrix, X, such that each input data record expresses a sequence of user actions. That one of the user devices 118 also saves such inference input data into a suitable onboard memory and/or causes the inference input data to be saved into the one or more remote data-storage modules 124.

At step 550, the method 500 communicates the inference input data (generated at step 540) to the trained artificial neural network (trained at step 530). For example, when using the network environment 100, the SCDMM 220 causes the FANNM 268 (and more particularly, the input module 308) to receive (through the network 112 and the NIM 236) the inference input data records from one of the user devices 118 and/or from one or more of the remote data-storage modules 124.

At step 560, the method 500 uses the trained artificial neural network (trained at step 530) to generate one or more recommended next user actions. For example, when using the network environment 100, the SCDMM 220 causes the FANNM 268 (including the FANNA 300) to perform the forward-propagation operations 400 (described above). Further, the SCDMM 220 receives (from the FANNM 268) or otherwise suitably accesses (e.g., in the LDSM 252 or other suitable memory) the row matrix, R. Here, it should be appreciated that each element in the row matrix, R, is effectively indexed or otherwise mapped to one and only one of the modeled user actions (via the indexing or other mapping of the current-step matrix, C1, the current-step matrix, C2, the next-step matrix, N1, and the next-step matrix, N2). It should also be appreciated that the relative magnitude of each element of the row matrix, R, is proportional to a probability that (according to the wisdom of the crowd) the next true action should be the user action to which that particular element of the row matrix, R, is indexed or otherwise mapped. Accordingly, when using the network environment 100, the SCDMM 220 generates the recommended next user action comprising an identification of the user action indexed or otherwise mapped to the element of the row matrix, R, that (of all of the elements of the row matrix, R) has the maximum value. Moreover, as opposed to only a single recommendation, in some embodiments the SCDMM 220 generates a ranked list of recommended next user actions corresponding to the relative magnitudes of a plurality of the elements of the row matrix, R.

At step 570, the method 500 communicates the one or more recommended next user actions (generated at step 560) to the user device. For example, when using the network environment 100, the SCDMM 220 communicates one or more expressions or other identifications of the one or more recommended next user actions (through the NIM 236 and the network 112 and) to the one of the user devices 118 that generated and communicated (at step 540 and step 550, respectively) the inference input data.

Figure 6:
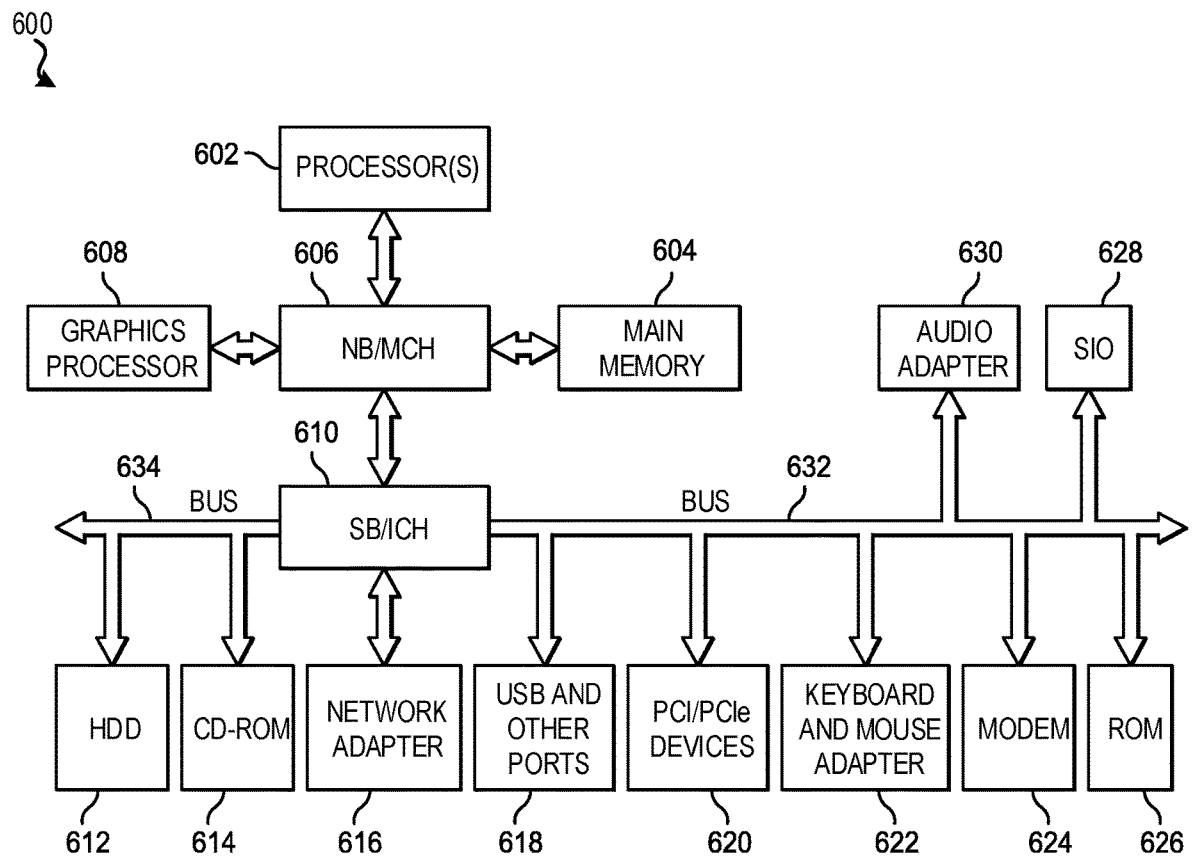
FIG. 6 is a block diagram illustrating a hardware architecture of a data processing system in accordance with aspects of the present disclosure.

FIG. 6 is a block diagram illustrating a hardware architecture of a data processing system 600 in accordance with aspects of the present disclosure. In some embodiments, one or more of the systems and/or components described herein (e.g., the network 112, the one or more user devices 118, the one or more remote data-storage modules 124, the one or more server devices 130) may be implemented using a corresponding one or more of the data processing system 600. Moreover, the data processing system 600 may be configured to store and execute one or more instructions of one or more of the methods and/or any other processes described herein.

The data processing system 600 employs a hub architecture including north bridge and memory controller hub ("NB/MCH") 606 and south bridge and input/output ("I/O") controller hub ("SB/ICH") 610. Processor(s) 602, main memory 604, and graphics processor 608 are connected to NB/MCH 606. Graphics processor 608 may be connected to NB/MCH 606 through an accelerated graphics port ("AGP"). A computer bus, such as bus 632 or bus 634, may be implemented using any type of communication fabric or architecture that provides for a transfer of data between different components or devices attached to the fabric or architecture.

Network adapter 616 connects to SB/ICH 610. Audio adapter 630, keyboard and mouse adapter 622, modem 624, read-only memory ("ROM") 626, hard disk drive ("HDD") 612, compact disk read-only memory ("CD-ROM") drive 614, universal serial bus ("USB") ports and other communication ports 618, and peripheral component interconnect/peripheral component interconnect express ("PCI/PCIe") devices 620 connect to SB/ICH 610 through bus 632 and bus 634. PCI/PCIe devices may include, for example, Ethernet adapters, add-in cards, and personal computing ("PC") cards for notebook computers. PCI uses a card bus controller, while PCIe does not. ROM 626 may comprise, for example, a flash basic input/output system ("BIOS"). Modem 624 or network adapter 616 may be used to transmit and receive data over a network.

HDD 612 and CD-ROM drive 614 connect to SB/ICH 610 through bus 634. HDD 612 and CD-ROM drive 614 may use, for example, an integrated drive electronics ("IDE") or serial advanced technology attachment ("SATA") interface. In some embodiments, the HDD 612 may be replaced by other forms of data storage devices including, but not limited to, solid-state drives ("SSDs"). A super I/O ("SIO") device 628 may be connected to SB/ICH 610. SIO device 628 may comprise a chip on the motherboard that is configured to assist in performing less demanding controller functions for the SB/ICH 610 such as controlling a printer port, controlling a fan, and/or controlling the small light emitting diodes ("LEDS") of the data processing system 600.

The data processing system 600 may include a single processor 602 or may include a plurality of processors 602. Additionally, processor(s) 602 may have multiple cores. In some embodiments, data processing system 600 may employ a large number of processors 602 that include hundreds or thousands of processor cores. In some embodiments, the processors 602 may be configured to perform a set of coordinated computations in parallel.

An operating system is executed on the data processing system 600 using the processor(s) 602. The operating system coordinates and provides control of various components within the data processing system 600. Various applications and services may run in conjunction with the operating system. Instructions for the operating system, applications, and other data are located on storage devices, such as one or more of the HDD 612, and may be loaded into main memory 604 for execution by processor(s) 602. In some embodiments, additional instructions or data may be stored on one or more external devices. The processes described herein for the illustrative embodiments may be performed by processor(s) 602 using computer usable program code, which may be located in a memory such as, for example, main memory 604, ROM 626, or in one or more peripheral devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random-access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In accordance with aspects of the present disclosure, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented method, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. Further, the steps of the methods described herein may be carried out in any suitable order, or simultaneously where appropriate. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for recommending an action to a user of a user device, the method comprising:
   obtaining training data comprising a plurality of priority training data records, wherein each training data record comprises a sequence of user actions performed by one or more users while operating an application and a corresponding next user action that occurred after the sequence of user actions;
   training a feedforward artificial neural network utilizing the training data for generating a recommended next user action for operating the application based on user action data input;
   receiving first user action data corresponding to a first user action for operating the application;
   receiving second user action data corresponding to a second user action for operating the application;
   generating, based on the first user action data and the second user action data and utilizing the feedforward artificial neural network, a recommendation for a next user action for operating the application; and
   causing the recommendation for the next user action to be communicated to the user device.

2. The method of claim 1, wherein generating, based on the first user action data and the second user action data and utilizing the feedforward artificial neural network, the recommendation for the next user action comprises:
   accessing a first set of parameters of the feedforward artificial neural network, the first set of parameters of the feedforward artificial neural network corresponding to the first user action data and being expressible as one row of a first matrix, the first matrix comprising a first dimensional number, M, of first-matrix rows, each of the first-matrix rows corresponding to one and only one user action of a plurality of M user actions, and the first matrix comprising a second dimensional number, F, of first-matrix columns;
   accessing a second set of parameters of the feedforward artificial neural network, the second set of parameters of the feedforward artificial neural network corresponding to the second user action data and being expressible as one row of the first matrix;
   generating, based on a row-wise matrix mean of a first plurality of rows of parameters of the feedforward artificial neural network, the first plurality of rows of parameters of the feedforward artificial neural network comprising the first set of parameters of the feedforward artificial neural network and the second set of parameters of the feedforward artificial neural network, a third set of parameters of the feedforward artificial neural network being expressible as a first row matrix;
   generating, based on a matrix multiplication of the third set of parameters of the feedforward artificial neural network by a fourth set of parameters of the feedforward artificial neural network, the fourth set of parameters of the feedforward artificial neural network being expressible as a second matrix comprising F second-matrix rows and M second-matrix columns, a fifth set of parameters of the feedforward artificial neural network being expressible as a second row matrix;
   generating, based on the fifth set of parameters of the feedforward artificial neural network, a sixth set of parameters of the feedforward artificial neural network comprising a first discrete probability distribution and being expressible as a third row matrix;
   accessing a seventh set of parameters of the feedforward artificial neural network, the seventh set of parameters of the feedforward artificial neural network corresponding to the second user action data and being expressible as one row of a third matrix, the third matrix comprising M third-matrix rows, each of the third-matrix rows corresponding to one and only one user action of the plurality of M user actions, and the third matrix comprising F third-matrix columns;
   generating, based on matrix multiplication of the seventh set of parameters of the feedforward artificial neural network by an eighth set of parameters of the feedforward artificial neural network, the eighth set of parameters of the feedforward artificial neural network being expressible as a fourth matrix comprising F fourth-matrix rows and M fourth-matrix columns, a ninth set of parameters of the feedforward artificial neural network being expressible as a fourth row matrix;
   generating, based on the ninth set of parameters of the feedforward artificial neural network, a tenth set of parameters of the feedforward artificial neural network comprising a second discrete probability distribution and being expressible as a fifth row matrix; and
   generating, based on the sixth set of parameters of the feedforward artificial neural network and the tenth set of parameters of the feedforward artificial neural network, the recommendation for the next user action.

3. The method of claim 2, wherein generating, based on the fifth set of parameters of the feedforward artificial neural network, the sixth set of parameters of the feedforward artificial neural network comprising the first discrete probability distribution and being expressible as the third row matrix comprises applying a softmax function to the fifth set of parameters of the feedforward artificial neural network.

4. The method of claim 3, wherein generating, based on the ninth set of parameters of the feedforward artificial neural network, the tenth set of parameters of the feedforward artificial neural network comprising the second discrete probability distribution and being expressible as the fifth row matrix comprises applying the softmax function to the ninth set of parameters of the feedforward artificial neural network.

5. The method of claim 4, wherein generating the recommendation for the next user action based on the sixth set of parameters of the feedforward artificial neural network and the tenth set of parameters of the feedforward artificial neural network comprises summing two operands, and wherein the sixth set of parameters of the feedforward artificial neural network is one of the two operands and the tenth set of parameters of the feedforward artificial neural network is another of the two operands.

6. The method of claim 5, further comprising:
generating a ranked plurality of recommendations for the next user action based on the sixth set of parameters of the feedforward artificial neural network and the tenth set of parameters of the feedforward artificial neural network; and
causing the ranked plurality of recommendations for the next user action to be communicated to the user device.

7. The method of claim 6, wherein causing the ranked plurality of recommendations for the next user action to be communicated to the user device includes causing the ranked plurality of recommendations for the next user action to be communicated over the Internet.

8. A system for recommending an action to a user of a user device, the system comprising:
a memory having instructions therein; and
at least one processor in communication with the memory, wherein the at least one processor is configured to execute the instructions to:
  obtain training data comprising a plurality of priority training data records, wherein each training data record comprises a sequence of user actions performed by one or more users while operating an application and a corresponding next user action that occurred after the sequence of user actions;
  train a feedforward artificial neural network utilizing the training data for generating a recommended next user action for operating the application based on user action data input;
  receive first user action data corresponding to a first user action for operating an application;
  receive second user action data corresponding to a second user action for operating the application;
  generate, based on the first user action data and the second user action data and utilizing the feedforward artificial neural network, a recommendation for a next user action for operating the application; and
  cause the recommendation for the next user action to be communicated to the user device.

9. The system of claim 8, wherein the at least one processor is also configured to execute the instructions to:
  access a first set of parameters of the feedforward artificial neural network, the first set of parameters of the feedforward artificial neural network corresponding to the first user action data and being expressible as one row of a first matrix, the first matrix comprising a first dimensional number, M, of first-matrix rows, each of the first-matrix rows corresponding to one and only one user action of a plurality of M user actions, and the first matrix comprising a second dimensional number, F, of first-matrix columns;
  access a second set of parameters of the feedforward artificial neural network, the second set of parameters of the feedforward artificial neural network corresponding to the second user action data and being expressible as one row of the first matrix;
  generate, based on a row-wise matrix mean of a first plurality of rows of parameters of the feedforward artificial neural network, the first plurality of rows of parameters of the feedforward artificial neural network comprising the first set of parameters of the feedforward artificial neural network and the second set of parameters of the feedforward artificial neural network, a third set of parameters of the feedforward artificial neural network being expressible as a first row matrix;
  generate, based on a matrix multiplication of the third set of parameters of the feedforward artificial neural network by a fourth set of parameters of the feedforward artificial neural network, the fourth set of parameters of the feedforward artificial neural network being expressible as a second matrix comprising F second-matrix rows and M second-matrix columns, a fifth set of parameters of the feedforward artificial neural network being expressible as a second row matrix;
  generate, based on the fifth set of parameters of the feedforward artificial neural network, a sixth set of parameters of the feedforward artificial neural network comprising a first discrete probability distribution and being expressible as a third row matrix;
  access a seventh set of parameters of the feedforward artificial neural network, the seventh set of parameters of the feedforward artificial neural network corresponding to the second user action data and being expressible as one row of a third matrix, the third matrix comprising M third-matrix rows, each of the third-matrix rows corresponding to one and only one user action of the plurality of M user actions, and the third matrix comprising F third-matrix columns;
  generate, based on matrix multiplication of the seventh set of parameters of the feedforward artificial neural network by an eighth set of parameters of the feedforward artificial neural network, the eighth set of parameters of the feedforward artificial neural network being expressible as a fourth matrix comprising F fourth-matrix rows and M fourth-matrix columns, a ninth set of parameters of the feedforward artificial neural network being expressible as a fourth row matrix;
  generate, based on the ninth set of parameters of the feedforward artificial neural network, a tenth set of parameters of the feedforward artificial neural network comprising a second discrete probability distribution and being expressible as a fifth row matrix; and
  generate, based on the sixth set of parameters of the feedforward artificial neural network and the tenth set of parameters of the feedforward artificial neural network, the recommendation for the next user action.

10. The system of claim 9, wherein the at least one processor is also configured to execute the instructions to:
  apply a softmax function to the fifth set of parameters of the feedforward artificial neural network to generate a first softmax result; and
  generate the sixth set of parameters of the feedforward artificial neural network based on the first softmax result.

11. The system of claim 10, wherein the at least one processor is also configured to execute the instructions to:
  apply the softmax function to the ninth set of parameters of the feedforward artificial neural network to generate a second softmax result; and
  generate the tenth set of parameters of the feedforward artificial neural network based on the second softmax result.

12. The system of claim 11, wherein the at least one processor is also configured to execute the instructions to generate the recommendation for the next user action based on a sum of two operands, wherein the sixth set of parameters of the feedforward artificial neural network is one of the two operands, and wherein the tenth set of parameters of the feedforward artificial neural network is another of the two operands.

13. The system of claim 12, wherein the at least one processor is also configured to execute the instructions to:
  generate a ranked plurality of recommendations for the next user action based on the sixth set of parameters of the feedforward artificial neural network and the tenth set of parameters of the feedforward artificial neural network; and cause the ranked plurality of recommendations for the next user action to be communicated to the user device.

14. The system of claim 13, wherein the at least one processor is also configured to execute the instructions to cause the ranked plurality of recommendations for the next user action to be communicated over the Internet.

15. A computer program product for recommending an action to a user of a device, the computer program product comprising a computer readable storage medium having program instructions embodied therewith, the program instructions executable by at least one processor to cause the at least one processor to:

obtain training data comprising a plurality of priority training data records, wherein each training data record comprises a sequence of user actions performed by one or more users while operating an application and a corresponding next user action that occurred after the sequence of user actions;

train a feedforward artificial neural network utilizing the training data for generating a recommended next user action for operating the application based on user action data input;

receive first user action data corresponding to a first user action for operating an application;

receive second user action data corresponding to a second user action for operating the application;

generate, based on the first user action data and the second user action data and utilizing the feedforward artificial neural network, a recommendation for a next user action for operating the application; and cause the recommendation for the next user action to be communicated to the user device.

16. The computer program product of claim 15, wherein the program instructions are also executable by the at least one processor to cause the at least one processor to:

access a first set of parameters of the feedforward artificial neural network, the first set of parameters of the feedforward artificial neural network corresponding to the first user action data and being expressible as one row of a first matrix, the first matrix comprising a first dimensional number, M, of first-matrix rows, each of the first-matrix rows corresponding to one and only one user action of a plurality of M user actions, and the first matrix comprising a second dimensional number, F, of first-matrix columns;

access a second set of parameters of the feedforward artificial neural network, the second set of parameters of the feedforward artificial neural network corresponding to the second user action data and being expressible as one row of the first matrix;

generate, based on a row-wise matrix mean of a first plurality of rows of parameters of the feedforward artificial neural network, the first plurality of rows of parameters of the feedforward artificial neural network comprising the first set of parameters of the feedforward artificial neural network and the second set of parameters of the feedforward artificial neural network, a third set of parameters of the feedforward artificial neural network being expressible as a first row matrix;

generate, based on a matrix multiplication of the third set of parameters of the feedforward artificial neural network by a fourth set of parameters of the feedforward artificial neural network, the fourth set of parameters of the feedforward artificial neural network being express-ible as a second matrix comprising F second-matrix rows and M second-matrix columns, a fifth set of parameters of the feedforward artificial neural network being expressible as a second row matrix;

generate, based on the fifth set of parameters of the feedforward artificial neural network, a sixth set of parameters of the feedforward artificial neural network comprising a first discrete probability distribution and being expressible as a third row matrix;

access a seventh set of parameters of the feedforward artificial neural network, the seventh set of parameters of the feedforward artificial neural network corresponding to the second user action data and being expressible as one row of a third matrix, the third matrix comprising M third-matrix rows, each of the third-matrix rows corresponding to one and only one user action of the plurality of M user actions, and the third matrix comprising F third-matrix columns;

generate, based on matrix multiplication of the seventh set of parameters of the feedforward artificial neural network by an eighth set of parameters of the feedforward artificial neural network, the eighth set of parameters of the feedforward artificial neural network being express-ible as a fourth matrix comprising F fourth-matrix rows and M fourth-matrix columns, a ninth set of parameters of the feedforward artificial neural network being expressible as a fourth row matrix;

generate, based on the ninth set of parameters of the feedforward artificial neural network, a tenth set of parameters of the feedforward artificial neural network comprising a second discrete probability distribution and being expressible as a fifth row matrix; and generate, based on the sixth set of parameters of the feedforward artificial neural network and the tenth set of parameters of the feedforward artificial neural network, the recommendation for the next user action.

17. The computer program product of claim 16, wherein the program instructions are also executable by the at least one processor to cause the at least one processor to:

apply a softmax function to the fifth set of parameters of the feedforward artificial neural network to generate a first softmax result; and generate the sixth set of parameters of the feedforward artificial neural network based on the first softmax result.

18. The computer program product of claim 17, wherein the program instructions are also executable by the at least one processor to cause the at least one processor to:

apply the softmax function to the ninth set of parameters of the feedforward artificial neural network to generate a second softmax result; and generate the tenth set of parameters of the feedforward artificial neural network based on the second softmax result.

19. The computer program product of claim 18, wherein the program instructions are also executable by the at least one processor to cause the at least one processor to generate the recommendation for the next user action based on a sum of two operands, wherein the sixth set of parameters of the feedforward artificial neural network is one of the two operands, and wherein the tenth set of parameters of the feedforward artificial neural network is another of the two operands.

20. The computer program product of claim 19, wherein the program instructions are also executable by the at least one processor to cause the at least one processor to:

generate a ranked plurality of recommendations for the next user action based on the sixth set of parameters of the feedforward artificial neural network and the tenth set of parameters of the feedforward artificial neural network; and
cause the ranked plurality of recommendations for the next user action to be communicated to the user device.

\* \* \* \* \*